June 1, 1926.  
E. T. FERNGREN  
1,586,620  
METHOD AND APPARATUS FOR CONTINUOUSLY DRAWING SHEET GLASS  
Filed Oct. 11, 1922
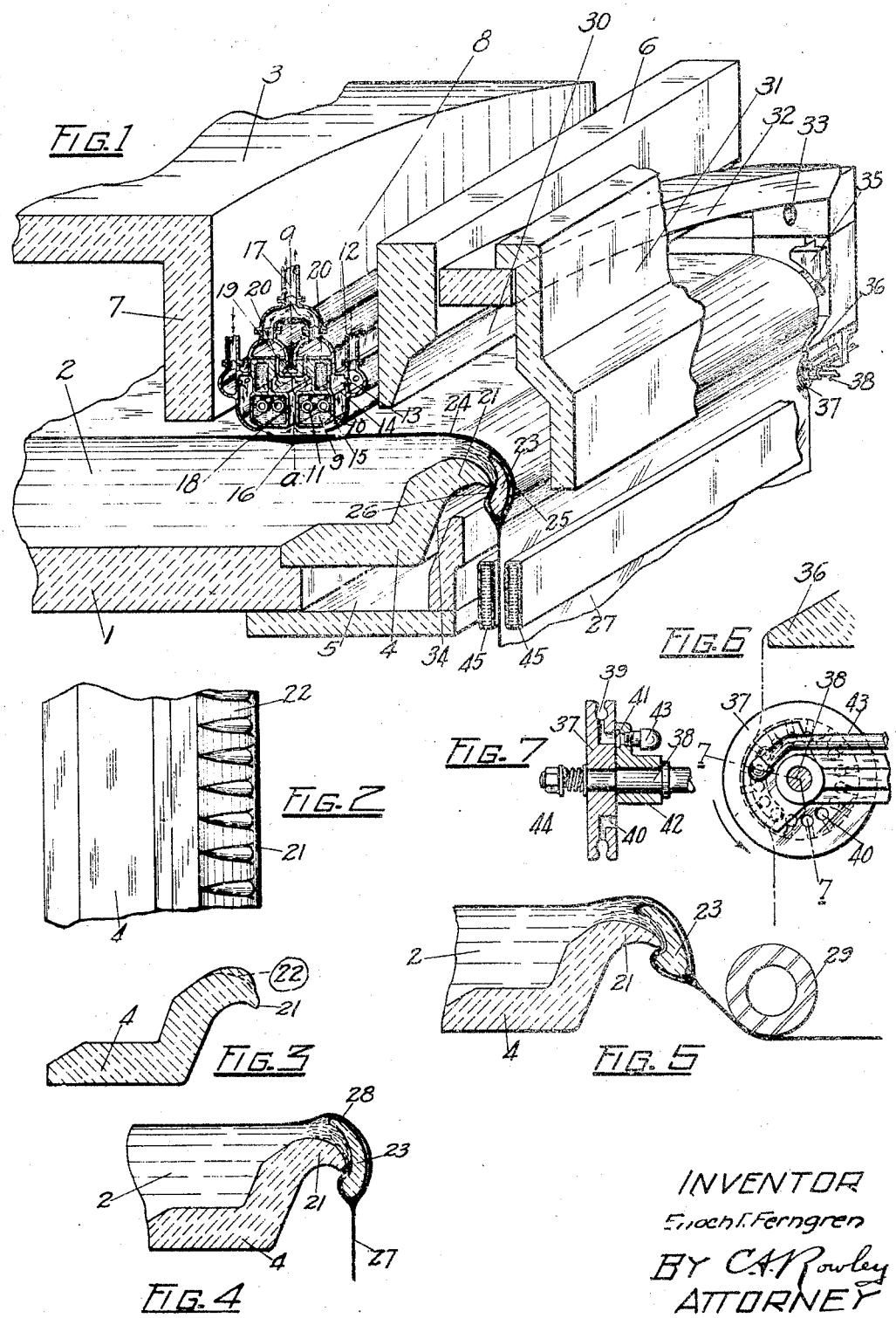
INVENTOR  
Enoch T. Ferngren  
BY C. A. Rowley  
ATTORNEY Patented June 1, 1926.

1,586,620

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR CONTINUOUSLY DRAWING SHEET GLASS.

Application filed October 11, 1922. Serial No. 593,884.

This invention relates to the art of drawing sheet glass, and more particularly to a method and apparatus for drawing a sheet of glass downwardly over the edge of the receptacle containing the supply of molten glass.

In general, the system here disclosed involves, first, the congealing of a localized area of tenacious semi-rigid glass upon the surface of the pool of molten glass in the containing receptacle. This body or surface sheet of colder glass is then drawn toward the overflow lip at the side of the receptacle and partially reheated so that it may be floated and bent over the edge of the receptacle and simultaneously attenuated into sheet form. Means are also disclosed for providing a flow of more liquid glass beneath this surface sheet to act as a lubricant in floating the colder glass over the edge of the receptacle. A suitable guiding and anchoring member is provided adjacent the overflow lip for supporting this fluid glass and delivering same to the underside of the sheet, to which it is continually fed and congealed to form a smooth unblemished surface layer on the under face of the sheet. The invention also discloses an improved form of cooling apparatus for producing the localized surface sheet of semi-rigid glass, and also an improved form of guiding or supporting member over which the sheet is carried into the vertical plane. An improved form of edge-holding device, especially adapted for use with this form of sheet drawing appartus, is also disclosed.

Other objects and advantages of this invention will be apparent from the following detailed description of certain forms of apparatus well adapted to carry out the purposes of this invention.

In the accompanying drawings:—

Fig. 1 is a perspective of the assembled apparatus, a portion thereof in the foreground being shown in vertical section, and some of the parts being broken away to facilitate the disclosure.

Fig. 2 is a plan view of a portion of the overflow lip.

Fig. 3 is a transverse vertical section through this lip.

Fig. 4 is a transverse section through the overflow lip and the guiding and supporting tile; their relative arrangement being somewhat different from that disclosed in Fig. 1.

Fig. 5 shows a still different arrangement of the overflow lip and guiding member.

Fig. 6 is a side elevation on a larger scale, of one of the edge-forming and guiding members.

Fig. 7 is a section through this edge-holding member, the view being taken substantially on the line 7—7 of Fig. 6.

At 1 is shown the end of a tank or receptacle for a supply of molten glass 2 which is continuously delivered from any suitable source of supply, preferably a continuous tank furnace. As will be understood, this glass is enclosed and heated in any suitable manner, part of the upper enclosing arch being indicated at 3 in Fig. 1. The main portion of the body of molten glass 2 is of considerable depth, but at the forward end of the receptacle, the depth is gradually decreased by means of the forward upwardly sloping portion of the overflow tile 4, which will presently be described more in detail. The glass above this tile 4 is heated to maintain same in a sufficiently fluid condition by means of the heating chamber 5 beneath this tile. A cut-off gate 6 adjacent the overflow end of the receptacle may be lowered into the molten glass by any suitable means (not shown), in order to hold back the molten glass when the drawing operation is to be discontinued. Normally, the lower edge of this tile 6 is positioned above but close to the surface of the molten glass.

Between the gate 6 and the partition member 7 at the forward end of the covering arch 3 is a chamber 8, in which is located the apparatus for continuously and quickly congealing a surface layer of cooler cohesively firm glass upon the surface of the molten pool 2. Although many different types of cooling devices might be here used to carry out the purposes of this invention, a preferred type of cooler is disclosed, which is especially adapted for this purpose, and which will function to positively and rapidly congeal a definite localized area of colder glass upon the surface of the molten pool. This cooler which extends transversely of the receptacle between walls 6 and 7, comprises two similar opposite facing halves, the apparatus being symmetrical at the two sides of the central plane a—a. Each half of the device comprises a chamber 9 filled with a continuously renewed supply of cold water, or other cooling liquid, the water flowing in through pipe 10 and out through pipe 11. Compressed air is forced in through pipe 12 as indicated by the arrows and passes from the outer manifold 13 through the enclosing jacket or casing 14 around the outside of the water cooler 9 and is directed by the inwardly flaring end 15 of this jacket against the surface of the molten glass. This air will be chilled during its passage around the cooler 9, and in this condition is forced directly against the molten glass from which it will absorb a large portion of the heat at this point. It will be noted that the air is forced in opposite directions from the two halves of the cooler against the area of glass indicated at 16, which is passing slowly beneath the cooler. At 17 is shown an exhaust which is connected to a suitable vacuum supplying machine, and the compressed air which is delivered from both sides of the cooler against the body of glass 16 will be drawn up through the center of the cooling apparatus through the passages 18, suction chambers 19 and 20, and carried out through the exhaust 17. In this way, it will be seen that a continuous current of cooling air is passed directly around the chilling members and directed against a definitely localized area of the glass surface, and this air after absorbing heat from the glass is drawn away through the cooler without becoming dissipated through the furnace to retard or interfere with the heating actions at other points in the apparatus.

The tile 4 is formed at its upper outer edge with a rounded overflow lip 21 which is preferably provided with glass impounding channels 22, as best shown in Fig. 2. These channels, by presenting additional surface to the flowing glass, exert a greater retarding effect on the liquid glass which flows to the under surface of the sheet than would be the case if the lip were left smooth. Positioned just beyond and parallel to the lip 21 is a guiding, and sheet source supporting, tongue-member 23, which has preferably substantially the form shown in Figs. 1, 4 and 5. This member 23 acts as a barrier to somewhat check the flow of glass over the lip 21, the colder surface layer 24 being floated over the member 23 upon a film of liquid glass 25, whereas a second stream of liquid glass 26 is forced between the lip 21 and member 23 flowing around this inner side of the guiding tile to join the main stream at the lower edge of the tile and eventually be drawn into the under surface of the sheet 27. The main portion of the glass sheet 27 is formed by an attenuation of the cooler surface layer 24, this layer also sustaining the greater portion of the drawing tension. The streams of hotter more liquid glass 25 and 26 which flow directly around the overflow lip 21 and the guiding tile 23 act as a lubricant or carrying vehicle for the cooler more plastic glass and avoid the formation of lines or other blemishes which would be caused if this stiffer glass came into contact with and adhered to the tile surfaces of members 21 or 23. The guiding tile or barrier 23 is illustrated in a higher relative position in Fig. 4 than in Fig. 1, so that a greater volume of the molten glass will be banked up behind the upper end 28 of the member. In Fig. 5, the guide 23 is arranged at an angle to the vertical, and the sheet instead of being drawn vertically down is drawn off at an angle around a bending roll 29. These different views are merely illustrative of different positions in which the parts may be adjusted, the same working principle holding true in each modification.

A heating chamber 30 is provided above the flowing glass between the cooling apparatus and the overflow lip, the gate 6 serving as a rear wall of this chamber, and the hanging tile 31 suspended from the arch 32 serving as the front wall of this chamber. Any suitable means such as burners 33 may be employed to supply heat to this chamber. The object of this heating chamber is to somewhat soften and give a greater yieldability to congealed surface layer 16 so that this cooler plastic glass may be more readily bent over the lip 21 and tile 23 and stretched into sheet form. Heat from the chamber 5 below the tile floor is directed upwardly through passage 34 against the stream of liquid glass 26 flowing directly over the lip 21. This heat will keep this glass in such a liquid condition that it will not adhere to the draw-off edge of lip 21 and produce lines or blemishes on the under surface of the glass sheet.

Directly above each edge portion of the flowing glass may be placed an obstructing block 35. As shown in Fig. 1, this block is raised out of contact with the glass and has no function, but if the glass flows too freely near the edges of the sheet, this block may be lowered into the flowing glass and serve as a retarder at this point. This glass at the edges also flows down and over an inwardly directed refractory lip 36 which acts further to retard the glass which forms the source of the sheet edge and supply the necessary additional tension along the sheet edge.

Directly below these lips 36 is located a pair of additional edge-holding and guiding devices, one of which is shown more in detail in Figs. 6 and 7. Each of these members comprises a guiding and forming wheel 37 revolubly mounted on a supporting shaft 38. The edge of this wheel is provided with a rounded, undercut, channel 39 for receiving the plastic glass forming the edge of the sheet. A series of passages 40 lead from the bottom of this channel to one face of the disc or wheel 37, and during their inner arc of travel around shaft 38, these passages communicate with a chamber 41 in a fixed member 42. A pipe 43 leads from chamber 41 to any suitable suction apparatus for producing a partial vacuum in chamber 41. Spring means 44 on the end of shaft 38 tends to maintain the wheel 37 in close frictional contact with the stationary member 42. In this way, throughout the inner arc of travel of wheel 37, as shown in Fig. 6, a constant suction will be exerted in the channel 39. As the molten glass flowing into the sheet edge drops or is pulled down from the lip 36, it enters this channel and is drawn into and held in the channel 39 by the suction means already described. In this way the edge of the sheet will be held in the channel 39 while the wheel 37 is turned outwardly in the direction of the arrow of Fig. 6, and a sidewise or lateral stretching action will be imparted to the glass sheet. Even after the wheel 37 has passed beyond the member 42 and the suction is released, and additional pull on the sheet will be necessary to flatten out the bead that has been formed in the channel 39 and release same from the channel. It will be understood that the glass is still in a sufficiently plastic condition to allow this edge to be pulled out. By these means, the added tension is maintained at the edges which is necessary to produce a satisfactory and uniform glass sheet.

Immediately below the guiding and supporting tile 23, the sheet 27 is passed between a pair of coolers 45, which act to quickly set the sheet. The sheet may be carried continuously downward until sufficiently set to be divided into sheet sections or may be bent, while still somewhat plastic, about a bending roller and carried away in the horizontal plane.

The operation of the mechanism should be apparent from the foregoing description. A practically constant level of molten glass is supplied continuously to the container 1 from the melting tank or furnace. There will be a comparatively slow movement of the surface strata of the glass toward the overflow lip, and as this glass passes under the cooling device in chamber 8, the surface layer thereof is congealed into a tenacious semi-rigid condition, and this cooler layer is drawn forward through the heating chamber 30 wherein it is somewhat softened so that it will pass more readily around the bend at the overflow lip, and is simultaneously attenuated into more nearly sheet form. The underlying liquid glass which banks up to some extent behind the guiding tongue 22 will be divided thereby into two shallow streams 25 and 26. The cool plastic surface sheet 24 is floated over the tile 23 upon the upper liquid stream 25, whereas the lower stream 26 flows over the lip 21 and along the under side of the tile 23, joining to and forming the under surface of the sheet of glass 27 which is drawn away from the lower edge of the tile 23. The mass of cooler glass 16 on the surface of the pool functions as a sort of anchor for the surface glass 24 that is being drawn up into the sheet 27. The greater part of the drawing stress is taken up by this surface glass, there being very little stress upon the liquid streams 25 and 26 as they leave the receptacle. This glass sheet 27 passes immediately between the coolers 45 which quickly set it in substantially sheet form. It will be understood that any suitable type of drawing mechanism (not shown), is used to pull the sheet downwardly, or away from, the overflow edge of the receptacle.

Claims:—

1. The method of producing sheet glass, wherein a layer of cooler plastic glass is congealed upon a portion of the surface of a pool of liquid glass, this layer being reheated and then floated over the edge of the containing receptacle upon a film of liquid glass and drawn away in sheet form.

2. In an apparatus for producing sheet glass, a receptacle for the pool of molten glass, having an overflow lip at one edge thereof, means for congealing a localized area of cooler glass upon the surface of the pool, means for reheating this semi-rigid surface layer, and means for stretching and drawing this glass over the lip into sheet form.

3. In an apparatus for producing sheet glass, a receptacle for the pool of molten glass, having an overflow lip at one edge thereof, means for congealing a localized area of cooler glass upon the surface of the pool, a guiding member positioned in spaced parallel relation to the overflow lip, means for applying heat to the glass flowing down both faces of the guiding member, and means for drawing a glass sheet from the congealed surface layer after it is floated over the guiding member.

4. An apparatus for locally cooling molten glass, comprising a closed chamber and means for maintaining a circulation of cooling liquid therethrough, a jacket or enclosing casing for conducting cooling air around the chamber and directing same against the molten glass, and a vacuum system whereby this air is drawn away from the glass.

5. An apparatus for locally cooling molten glass, comprising a closed chamber and means for maintaining a circulation of cooling liquid therethrough, a compressed air supplying means, and an air-withdrawing means, for maintaining a circulation of air around the cooling chamber, the circulating air after being cooled, being directed against the surface of the molten glass.

6. An apparatus for locally cooling molten glass, comprising a closed chamber and means for maintaining a circulation of cooling liquid therethrough, a compressed air chamber, a suction chamber, and walled passages surrounding the cooling chamber, whereby the compressed air is directed around the cooling chamber and against the molten glass and then drawn away through the suction chamber.

7. A sheet-edge guiding and stretching member, comprising a rotatable member having a glass receiving channel in its periphery, and means for continuously exhausting the air from that arc of the member which is in engagement with the sheet edge.

8. A sheet-edge guiding and stretching member, comprising a rotatable member having an undercut glass receiving channel in its periphery, and means for continuously exhausting the air from that arc of the member which is in engagement with the sheet edge.

9. The method of drawing a sheet of glass downwardly from a supply of glass, which consists in producing a plastic surface layer as a cohesive unit on a body of glass, in progressively drawing said layer over a curved member downwardly from the supply, in increasing the tensional stress and speed of movement of the layer as it is drawn toward and over the curved member, and in drawing it downward from the member as a sheet of glass while depositing a layer of more fluent glass from the supply on the under surface thereof.

10. The method of drawing a sheet of glass downwardly from a supply of glass, which consists in producing a plastic surface layer as a cohesive unit in a body of glass, in progressively drawing said layer over a curved member downwardly from the supply, in increasing the tensional stress and speed of movement of the layer as it is drawn toward and over the curved member, in drawing it downward from the member as a sheet of glass while depositing a layer of more fluent glass from the supply on the under surface to increase the thickness, and in making the glass of the sheet more rigid as it advances below the member, while supporting its edge portions with rotating glass holding devices.

11. The method of drawing sheet glass, which consists in forming a floating body of plastic glass upon a larger body of less plastic glass in the vicinity of an overflow lip, and drawing a sheet of glass from the plastic body over the more fluid glass and downwardly over the said overflow lip, increasing the fluid property of the plastic glass while the same is under drawing stress and while it is moved over the more fluid glass and downward over the said lip, and increasing its tenacious and rigid properties as it departs from the said lip.

12. The method of forming plate glass, which consists in constantly forming a floating body of plastic glass from a predetermined portion of the surface layer of a more fluid body of glass, constantly drawing a sheet of glass first horizontally and thereafter vertically from the said plastic body supporting the edges of the sheet as it moves downwardly under tractive stress, and imparting greater stiffness to the edge portions of the sheet, and continuously depositing a layer of the more fluid glass upon one side of the said sheet to increase the thickness thereof as it is being drawn.

13. The method of drawing a sheet of glass in a general downward direction from an overflow lip without impairing the quality of the glass, which consists in making the surface of the glass adjacent the lip sufficiently cohesive to permit its response to the drawing action as a single unit moving in plane formation, in holding back and simultaneously controlling the quantitative discharge of the fluid glass beneath the said surface layer with a freely adjustable lip tile in a manner to cause the more fluid glass to move on that side of the tile which faces the overflow lip in a smooth and unmarred fashion, and simultaneously drawing the cohesive surface layer over the opposite side of the tile downwardly to a point of confluence with the said glass, and forming a continuously advancing sheet of glass beneath the tip of the tile.

14. The method of drawing a sheet of glass in a general downward direction from an overflow lip without impairing the quality of the glass, which consists in making the surface of the glass adjacent the lip sufficiently cohesive to permit its response to the drawing action as a single unit moving in plane formation, in holding back and simultaneously controlling the quantitative discharge of the fluid glass beneath the said surface layer with a freely adjustable lip tile in a manner to cause the more fluid glass to move on that side of the tile which faces the overflow lip in a smooth and unmarred fashion, simultaneously drawing the cohesive surface layer over the opposite side of the tile downwardly to a point of confluence with the said glass, forming a continuously advancing sheet of glass beneath the tip of the tile, heating the exposed surface of the more fluid glass on that side of the tile which faces the lip, and cooling the freely exposed sheet area immediately below its point of departure from the tile.

15. The method of supporting the weight of the sheet of glass in the downward drawing thereof from a tongue tile, which consists first in advancing the glass from a supply over a discharge lip in a manner to cover both sides of said tile, then in creating a difference of tractive response in the glass thus advancing by making one portion more tenacious and providing an anchorage therefor in the body of glass rearward of the discharge lip, in drawing said glass as a united sheet from the tongue tile while under tensional stress and resistance from the point of anchorage of the more tenacious glass, and thereafter supporting the borders of the sheet drawn with rotating edge-gripping parts in a manner to increase the tensional stress along the opposite edge-bordering portions of the sheet.

16. In the manufacture of sheet glass, the method which consists in providing a fluent body of glass adjacent the discharge lip of a furnace part, in maintaining a predetermined depth of said body over said lip and controlling the advance of glass therefrom with an adjustable barrier so spaced in regard to the lip as to permit a movement from the upper and lower stratum of the glass at the lip over the front and rear of the barrier, in forming a tensional unit of plastic glass in the surface layer of the fluent body, and extending a moving sheet formation therefrom while under stretching tension over the fluent glass at the lip and the front of the barrier and thereby augmenting the passage of fluent glass to the rear of the barrier, in uniting this glass with the stretching sheet as the same is drawn free from the barrier, and carrying forward a sufficient amount of fluent glass with the extension of the plastic glass to prevent its adhesion to the front of the barrier.

Signed at Charleston, in the county of Kanawha, and State of West Virginia, this 5th day of October, 1922.

ENOCH T. FERNGREN.